US010805975B2

(12) United States Patent
Kim et al.

(10) Patent No.: US 10,805,975 B2
(45) Date of Patent: Oct. 13, 2020

(54) DEVICE-TO-DEVICE DIRECT COMMUNICATION METHOD IN WIRELESS COMMUNICATION SYSTEM AND DEVICE THEREFOR

(71) Applicant: LG ELECTRONICS INC., Seoul (KR)

(72) Inventors: Taehun Kim, Seoul (KR); Sunghoon Jung, Seoul (KR); Laeyoung Kim, Seoul (KR); Jaewook Lee, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/776,766

(22) PCT Filed: Oct. 26, 2016

(86) PCT No.: PCT/KR2016/012080
§ 371 (c)(1),
(2) Date: May 16, 2018

(87) PCT Pub. No.: WO2017/086618
PCT Pub. Date: May 26, 2017

(65) Prior Publication Data
US 2018/0332652 A1  Nov. 15, 2018

Related U.S. Application Data

(60) Provisional application No. 62/257,663, filed on Nov. 19, 2015, provisional application No. 62/291,524, (Continued)

(51) Int. Cl.
*H04W 4/00* (2018.01)
*H04W 76/23* (2018.01)
(Continued)

(52) U.S. Cl.
CPC .............. *H04W 76/23* (2018.02); *H04B 7/14* (2013.01); *H04B 17/318* (2015.01);
(Continued)

(58) Field of Classification Search
CPC ..... H04W 76/14; H04W 76/23; H04W 76/27; H04W 76/30
See application file for complete search history.

(56) References Cited

U.S. PATENT DOCUMENTS

2013/0121225 A1   5/2013   Ryu
2016/0135143 A1*  5/2016   Won .................... H04W 72/005
                                                    370/312
(Continued)

FOREIGN PATENT DOCUMENTS

CN   101141173   3/2008
CN   103634812   3/2014
(Continued)

OTHER PUBLICATIONS

PCT International Application No. PCT/KR2016/012080, Written Opinion of the International Searching Authority dated Feb. 6, 2017, 16 pages.

(Continued)

*Primary Examiner* — Bo Hui A Zhu
(74) *Attorney, Agent, or Firm* — Lee Hong Degerman Kang Waimey

(57) ABSTRACT

Disclosed are a method for performing direct communication and a remote UE, the method: receiving, at a Prose layer or an NAS layer of the remote UE, from a lower layer, information indicating that the use of a wireless resource for direct communication with relay UE is stopped since a predetermined AS condition is not satisfied; and stopping (Continued)

communication with the relay UE through a PC5 interface and locally releasing a direction connection with the relay UE.

14 Claims, 14 Drawing Sheets

Related U.S. Application Data filed on Feb. 5, 2016, provisional application No. 62/336,580, filed on May 14, 2016, provisional application No. 62/341,035, filed on May 24, 2016.

(51) Int. Cl.
| | |
|---|---|
| *H04W 92/18* | (2009.01) |
| *H04W 88/02* | (2009.01) |
| *H04W 76/30* | (2018.01) |
| *H04W 76/10* | (2018.01) |
| *H04B 17/318* | (2015.01) |
| *H04W 76/38* | (2018.01) |
| *H04W 76/14* | (2018.01) |
| *H04W 76/27* | (2018.01) |
| *H04B 7/14* | (2006.01) |
| *H04W 88/04* | (2009.01) |

(52) U.S. Cl.
CPC .......... *H04W 76/10* (2018.02); *H04W 76/14* (2018.02); *H04W 76/27* (2018.02); *H04W 76/30* (2018.02); *H04W 76/38* (2018.02); *H04W 88/02* (2013.01); *H04W 92/18* (2013.01); *H04W 88/04* (2013.01)

(56) References Cited

U.S. PATENT DOCUMENTS

| | | | | |
|---|---|---|---|---|
| 2016/0381491 | A1* | 12/2016 | Watfa | H04W 76/14 455/41.2 |
| 2017/0034751 | A1* | 2/2017 | Fujishiro | H04W 36/0083 |
| 2018/0359805 | A1* | 12/2018 | Tsuda | H04W 36/30 |

FOREIGN PATENT DOCUMENTS

| | | |
|---|---|---|
| CN | 103975626 | 8/2014 |
| CN | 104717714 | 6/2015 |
| CN | 104937989 | 9/2015 |
| CN | 105009610 | 10/2015 |
| CN | 105050152 | 11/2015 |
| KR | 10-2012-0073146 | 7/2012 |
| KR | 10-2015-0022240 | 3/2015 |
| WO | 2015002456 | 1/2015 |
| WO | 2015005900 | 1/2015 |
| WO | 2015115843 | 8/2015 |
| WO | 2015119428 | 8/2015 |
| WO | 2016186387 | 11/2016 |

OTHER PUBLICATIONS

QUALCOMM, "Open Issues of UE-to-Network Relay", 3GPP TSG RAN WG2 Meeting #92, R2-156714, Nov. 2015, 4 pages.
Huawei, et al., "Discussion on scenarios of UE-to-Network relay", 3GPP TSG RAN WG2 Meeting #92, R2-156524, Nov. 2015, 2 pages.
European Patent Office Application Serial No. 16866570.1, Search Report dated Jul. 4, 2019, 8 pages.
Nuawei, HiSilicon, "Remaining issues for ProSe UE-to-Network relay procedure", R2-156525, 3GPP TSG-RAN WG2 #92, Nov. 2015, 4 pages.
ITRI, "Discussion on the influence of RRC Connection Release to ProSe D2D Service", R2-144992, 3GPP TSG-RAN WG2 #88, Nov. 2014, 3 pages.
Ericsson, "Release handling in ProSe", R2-143429, 3GPP TSG-RAN WG2 #87. Aug. 2014, 3 pages.
Korean Intellectual Property Office Application No. 10-2018-7010988, Notice of Allowance dated Oct. 27, 2019, 3 pages.
Huawei, et al., "Procedure of Relay-UE selection and reselection", 3GPP TSG RAN WG2 Meeting #91, R2-153403, Aug. 2015, 4 pages.
ITL, "Considerations on PC5 link release for multiple remote UEs", 3GPP TSG RAN WG2 Meeting #92, R2-156321, Nov. 2015, 7 pages.
QUALCOMM, "PC5 signalling protocol for one-to-one ProSe direct communication", 3GPP TSG-CT WG1 Meeting #94, C1-153680, Oct. 2015, 20 pages.
The State Intellectual Property Office of the People's Republic of China Application Serial No. 201680066613.2, Office Action dated Apr. 2, 2020, 7 pages.

\* cited by examiner (a) UE-1 and UE-2 camp on different eNodeBs (b) UE-1 and UE-2 camp on the same eNodeB

DEVICE-TO-DEVICE DIRECT COMMUNICATION METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/ 012080, filed on Oct. 26, 2016, which claims the benefit of U.S. Provisional Application No. 62/257,663, filed on Nov. 19, 2015, 62/291,524, filed on Feb. 5, 2016, 62/336,580, filed on May 14, 2016, and 62/341,035, filed on May 24, 2016, the contents of which are all hereby incorporated by reference herein in their entirety.

TECHNICAL FIELD

The present invention relates to a wireless communication system, and more particularly, to a device-to-device (D2D) direct communication method for improving communication efficiency in a D2D direct communication (e.g., ProSe communication) environment and apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to reduce unnecessary radio resource and power consumption in ProSe communication.

Another object of the present invention is to achieve efficient direct communication through information exchange between layers at a UE.

A further object of the present invention is to reduce not only unnecessary operations of a UE releasing a direct link but also those of a peer UE.

The technical problems solved by the present invention are not limited to the above technical problems and other technical problems which are not described herein will become apparent to those skilled in the art from the following description.

Technical Solutions

To achieve these objects and other advantages, in an aspect of the present invention, provided herein is a method for performing direct communication, including: receiving, at a ProSe or NAS layer of a remote UE from a lower layer, information indicating that since a predetermined AS condition is not satisfied, use of radio resources for direct communication with a relay UE is stopped; and stopping the communication with relay UE through a PC5 interface and locally releasing the direct link to the relay UE.

The direct communication method may further include: measuring, at the lower layer, reference signal received power (RSRP) or reference signal received quality (RSRQ) of a serving cell of the remote UE; and when the measured RSRP or RSRQ is equal to or higher than a predetermined threshold, determining that the AS condition is not satisfied. In this case, the lower layer may be a radio resource control (RRC) layer of the remote UE.

The direct communication method may further include, after stopping the communication with the relay UE, starting a timer prior to locally releasing the direct link. In addition, when the timer expires, the direct link may be released.

When information indicating that the use of the radio resources is initiated is received because the AS condition is satisfied before expiration of the timer, the ProSe layer may stop the timer and initiate the communication with the relay UE.

The direct link may be locally released by deleting context information of the direct link and replacing the deleted context information with an evolved packet system (EPS) bearer context.

Even when the communication over the PC5 interface stops, transmission of a Direct Communication Release message may be exceptionally allowed. In this case, the Direct Communication Release message may include, as a release cause, information indicating that the communication with the relay UE is no longer needed.

According to the direct communication method, when the ProSe layer transmits, to the lower layer, a PC5 signaling message for releasing the direct link, an indicator indicating that the PC5 signaling message is the Direct Communication Release message may be transmitted together.

In another aspect of the present invention, provided herein is a remote user equipment (UE), including: a transmitter; a receiver; and a processor connected to the transmitter and receiver. In this case, the processor may be configured to: receive, at a ProSe or NAS layer of the remote UE from a lower layer, information indicating that since a predetermined AS condition is not satisfied, use of radio resources for the direct communication with the relay UE is stopped; and stop the communication with relay UE through a PC5 interface and locally release the direct link to the relay UE.

Advantageous Effects

As is apparent from the above description, the embodiments of the present invention have the following effects.

First, it is possible to reduce radio resource and power consumption at a UE by reducing unnecessary signaling in D2D direct communication.

Second, it is possible to reduce unnecessary operations based on the current UE state by exchanging information between UE's layers.

Third, it is possible to enhance the communication efficiency of a peer UE by improving operations of a UE releasing a direct link.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
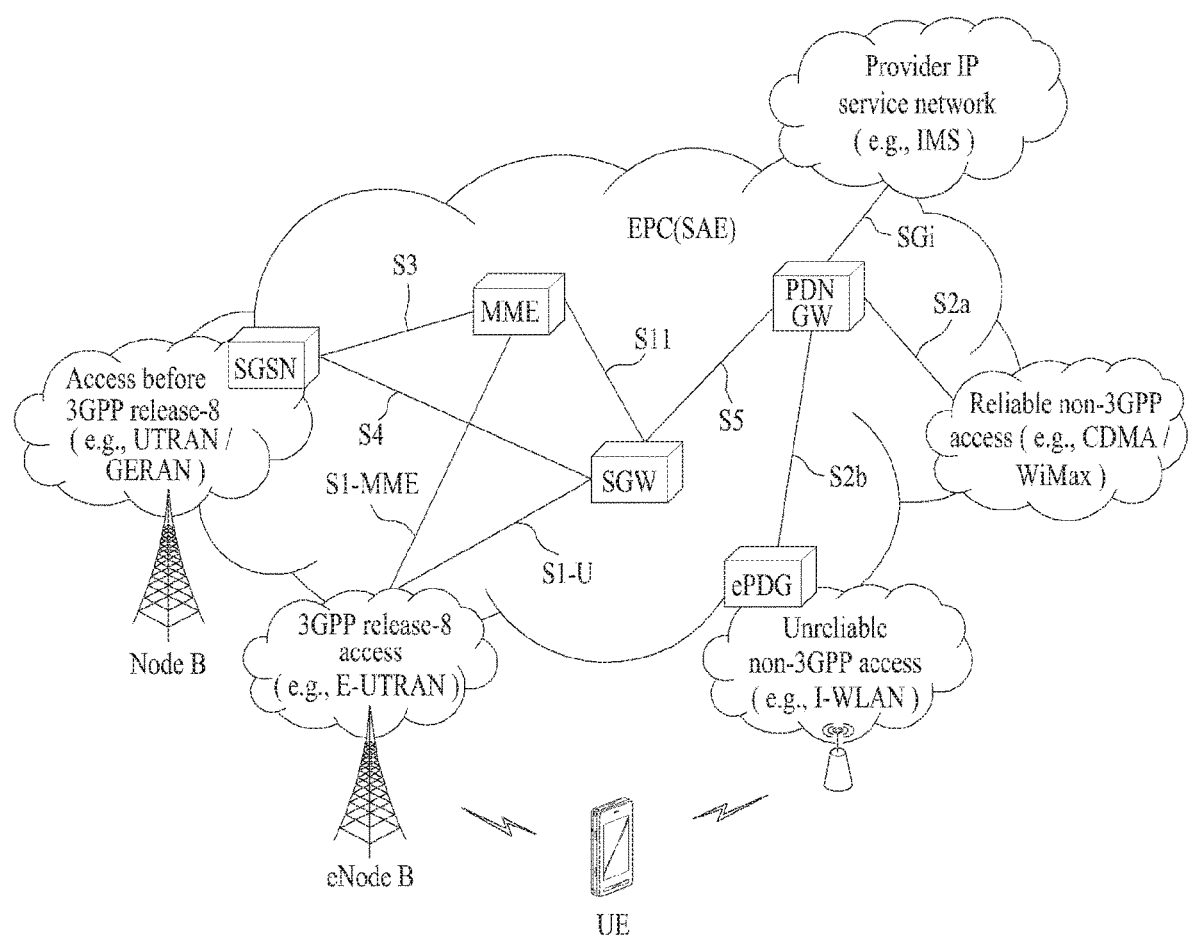
FIG. 1 is a diagram illustrating a brief structure of an EPS (evolved packet system) that includes an EPC (evolved packet core)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE)/LTE-Advanced (LTE-A) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16e-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

Terms used in the specification are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW/P-GW: a network node of an EPS network, which performs UE IP address allocation, packet screening and filtering, charging data collection, etc.

SGW (Serving Gateway/S-GW: a network node of an EPS network, which performs mobility anchor, packet routing, idle-mode packet buffering, and triggering of an MME's UE paging.

PCRF (Policy and Charging Rule Function): a network node of an EPS network, which performs a policy decision to dynamically apply different QoS and charging policies for each service flow.

OMA DM (Open Mobile Alliance Device Management): a protocol designed to manage mobile devices such as a cell phone, a PDA, and a laptop computer, which performs functions such as device configuration, firmware upgrade, error report, and the like.

OAM (Operation Administration and Maintenance): a set of network management functions, which provides network error display, performance information, data, and management functions.

NAS (Non-Access Stratum): a higher stratum of a control plane between a UE and MME. As a functional layer for exchanging signaling and traffic messages between a UE and core network in LTE/UMTS protocol stack, the NAS supports UE mobility, a session management procedure for establishing and maintaining an IP connection between a UE and PDN GW, and IP address management.

AS (Access-Stratum): the AS includes a protocol stack between a UE and a radio (or access) network, which manages transmission of data and network control signals.

NAS configuration MO (Management Object): the NAS configuration MO is a management object (MO) used to configure parameters related to NAS functionality for a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a character string for indicating or identifying PDN. To access a requested service or network, a connection to a specific P-GW is required. The APN means a name (character string) predefined in a network to search for the corresponding P-GW (for example, it may be defined as internet.mnc012.mcc345.gprs).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

Remote UE: This is a ProSe-enabled Public Safety UE that is connected to an EPC network through a ProSe UE-to-network relay instead of being served by an E-UTRAN in UE-to-Network Relay operation. That is, a PDN connection is provided to the remote UE.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS |

TABLE 1-continued

| Reference point | Description |
| --- | --- |
| | services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
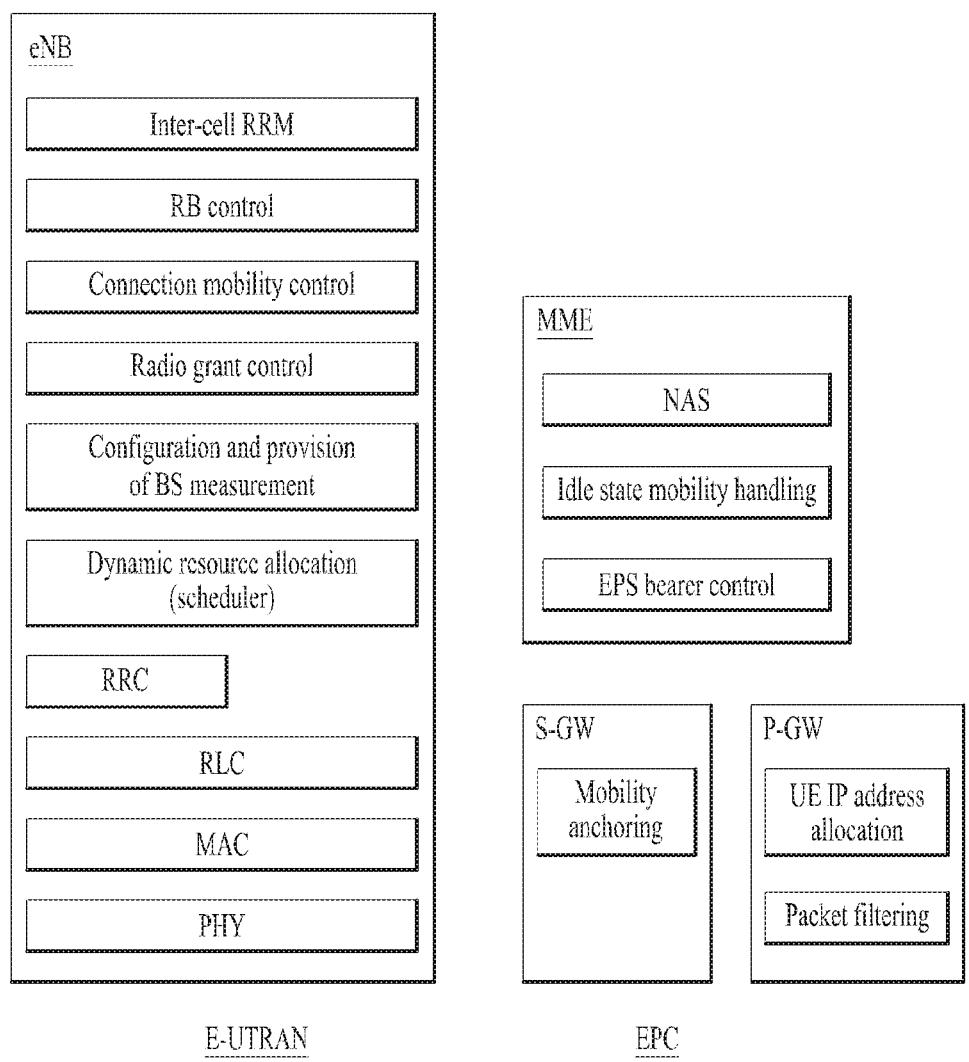
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
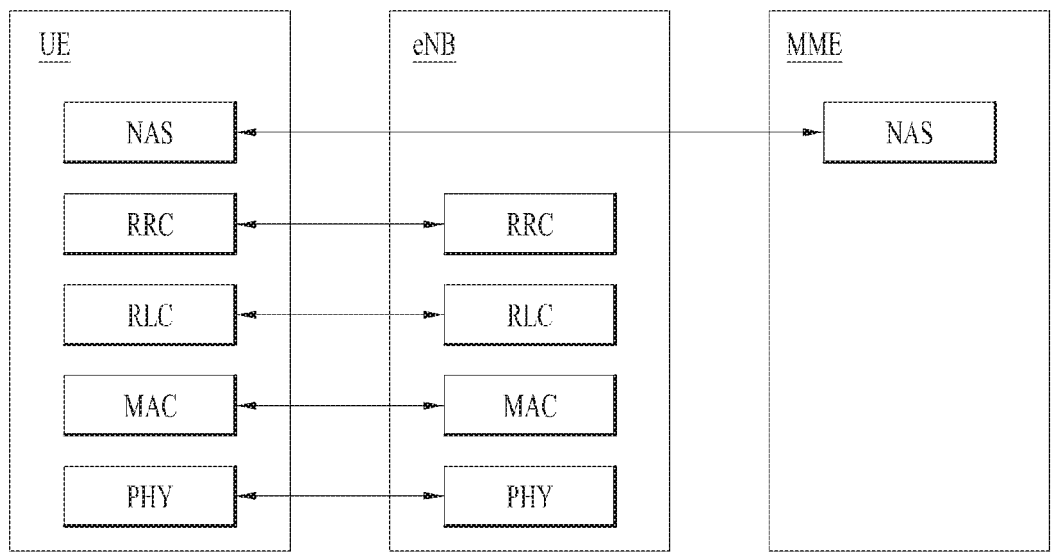
FIG. 3 is an exemplary diagram illustrating a structure of a radio interface protocol on a control plane.
Figure 4:
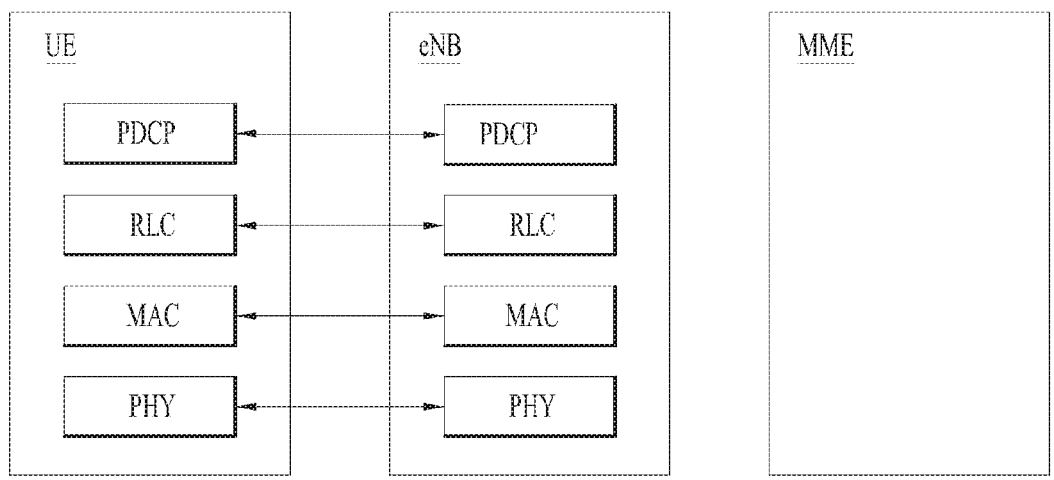
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of OFDM symbols in the time domain and a plurality of subcarriers. One subframe consists of a plurality of resource blocks. One resource block consists of a plurality of OFDM symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
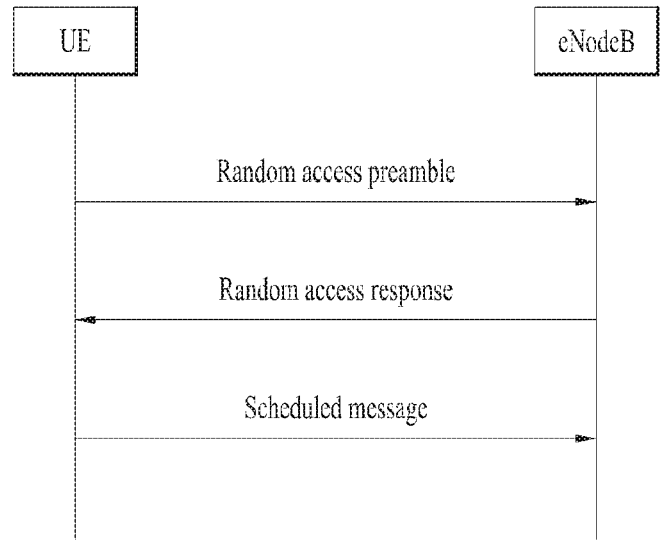
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
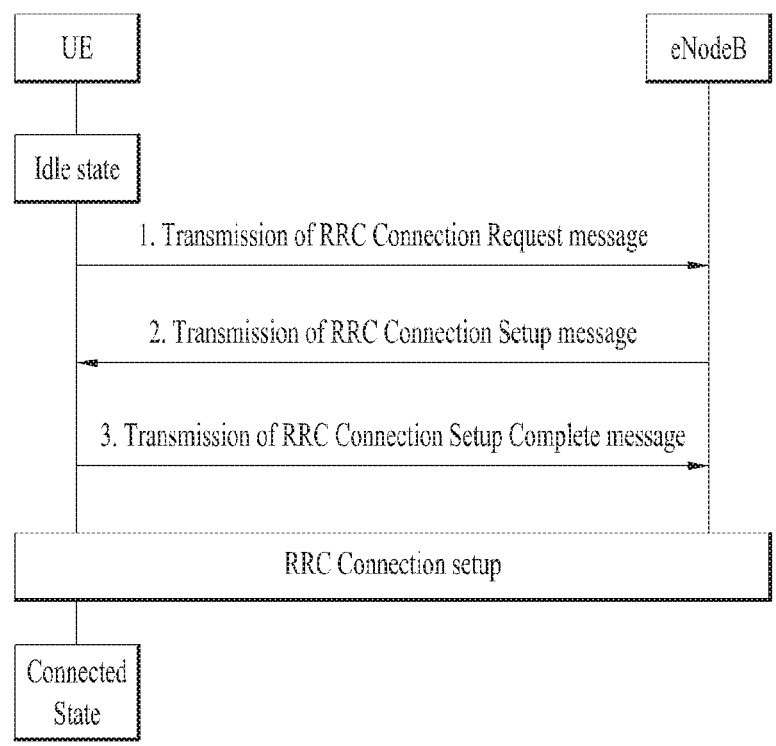
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. ProSe (Proximity Service)

As described above, ProSe service means a service that enables discovery between physically proximate devices and mutual direct communication, communication through a base station or communication through a third device.

Figure 7:
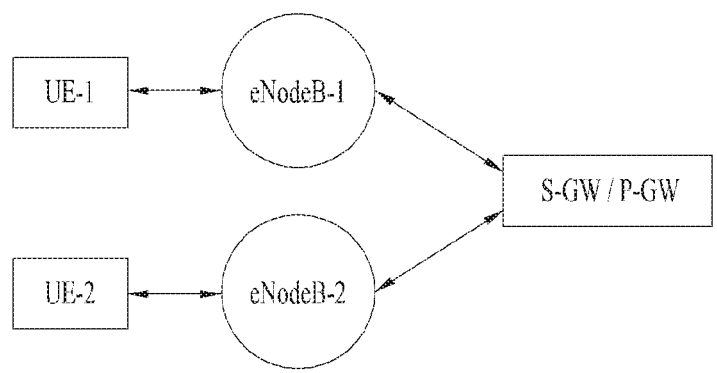
FIG. 7 illustrates a basic path for communication between two UEs in the EPS.

FIG. 7 illustrates a default data path through which two UEs perform communication with each other in an EPS. This default data path passes through an eNodeB and a core network (i.e., EPC), which are managed by an operator. In the present invention, this path will be referred to as an infrastructure data path (or EPC path). Also, communication through this infrastructure data path will be referred to as infrastructure communication.

Figure 8:
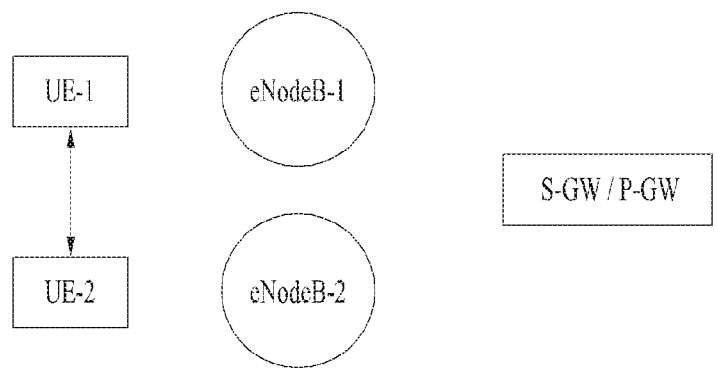
FIG. 8 illustrates a ProSe-based direct-mode communication path between two UEs.
Figure 8:
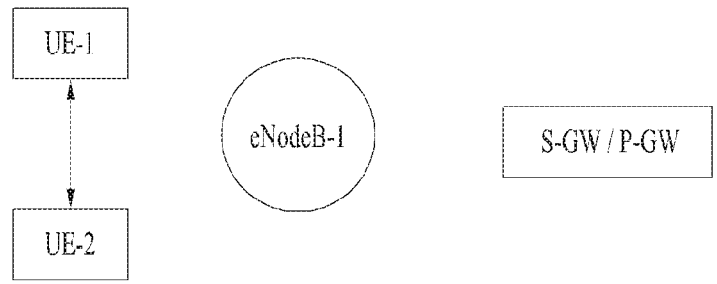

FIG. 8 illustrates a direct mode data path between two UEs based on ProSe. This direct mode communication path does not pass through the eNodeB and the core network (i.e., EPC), which are managed by an operator. FIG. 8(a) illustrates a case that UE-1 and UE-2 are camping on different eNodeBs and exchange data through a direct mode communication path. FIG. 8(b) illustrates a case that two UEs are camping on the same eNodeB and exchange data through a direct mode communication path.

Figure 9:
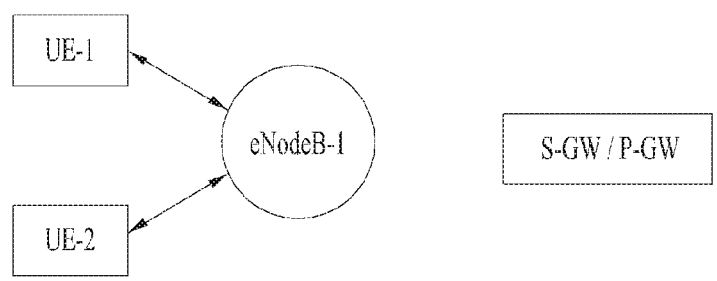
FIG. 9 illustrates a ProSe-based communication path between two UEs through an eNodeB.

FIG. 9 illustrates a locally routed data path through eNodeB between two UEs based on ProSe. This communication path through eNodeB does not pass through a core network (i.e., EPC) managed by an operator.

Figure 10:
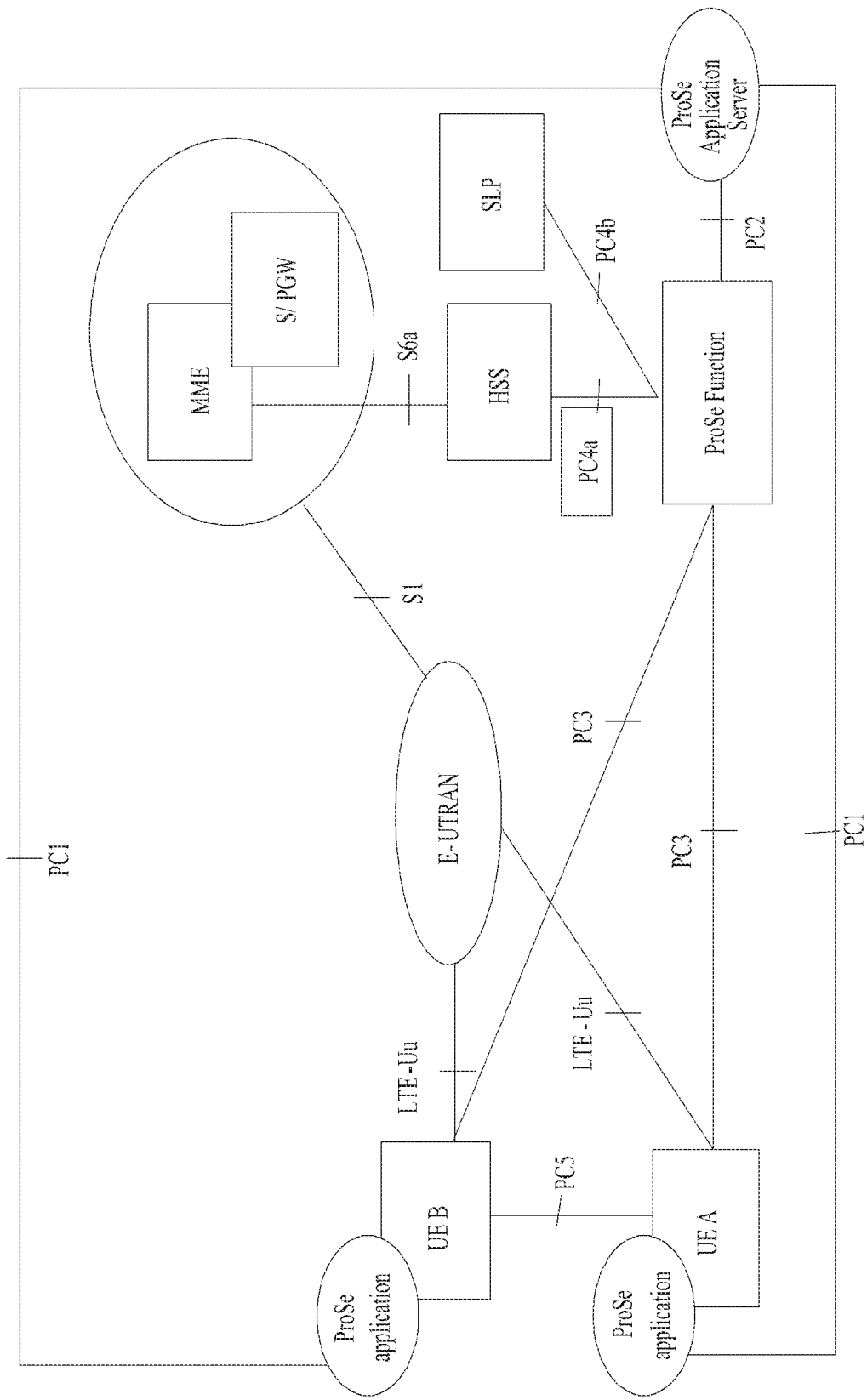
FIG. 10 illustrates a non-roaming reference architecture.

A non-roaming reference architecture is shown in FIG. 10. In the structure of FIG. 10, the EPC may determine proximity of two UEs and perform an EPC-level ProSe discovery procedure to notify the UE of the determined result. For this EPC-level ProSe discovery, a ProSe Function serves to determine proximity of two UEs and notify the UE of the determined result.

The ProSe function may retrieve and store ProSe associated subscriber data and/or ProSe associated subscriber data from HSS, and perform authentication and configuration for EPC level ProSe discovery and EPC sub WLAN direct discovery communication. Also, the ProSe function may be operated as a location service client that enables EPC level discovery, and may provide the UE of information for assisting WLAN direct discovery and communication. The ProSe function handles EPC ProSe User IDs and Application Layer User ID, and exchanges a signal with a third party application server for application registration identifier mapping. For transmission of a proximity request, proximity alerts and location report, the ProSe function exchanges a signal with a ProSe function of other PLMNs. In addition, the ProSe function provides various parameters required for ProSe discovery and ProSe communication. Details of the ProSe function are based on 3GPP TS 23.303.

Figure 11:
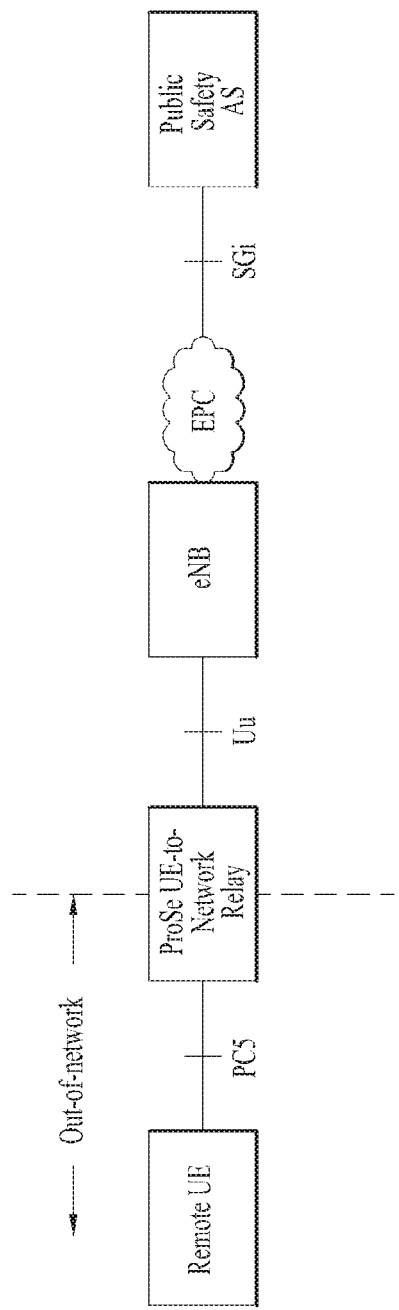
FIG. 11 is a diagram illustrating communication through a Prose UE-to-Network Relay.
Figure 12:
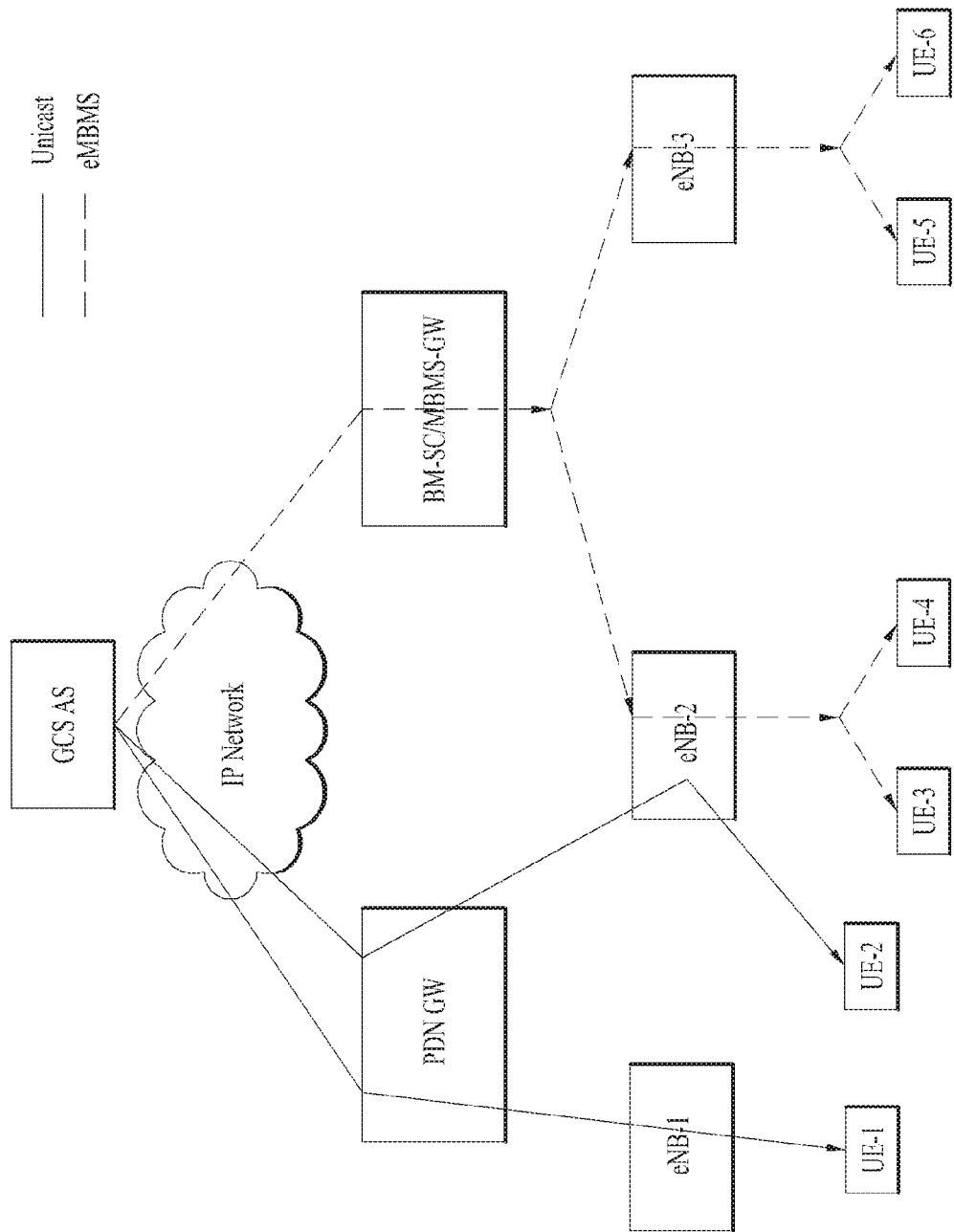
FIG. 12 is a diagram illustrating media traffic of group communication.

FIG. 11 illustrates communication through a ProSe UE-to-Network Relay. When a remote UE has connectivity to an EPC through a UE-to-network relay, the remote UE can communicate with an application server (AS) or participate in group communication. FIG. 12 shows an example in which a remote UE participate in group communication. UE-1 to UE-6 which are UEs belonging to the same group in FIG. 12 may receive downlink traffic through unicast or MBMS for specific media that configure group communication. As a result, although not in E-UTRAN coverage, the remote UE may transmit media traffic to other group members (that is, generate uplink traffic) by joining group communication through the UE-to-Network Relay or receive media traffic transmitted from other group members. In FIG. 12, a GCS AS (Group Communication Service Application Server) may serve to i) exchange GC1 signalling, ii) receive uplink data from a unicast UE, iii) transfer data to all UEs, which belong to a group, by using Unicast/MBMS delivery, iv) transmit application level session information through Rx interface to a PCRF, and v) support a service continuity procedure for a UE which is switched between Unicast Delivery and MBMS Delivery. The GCS AS, Public Safety AS, and GCSE AS (Group Communication Service Enabler Application Server) may be interpreted to refer to the same meaning and include AS that controls/manages communication joined by a plurality of UEs. Details of group communication is based on TS 23.468.

Figure 13:
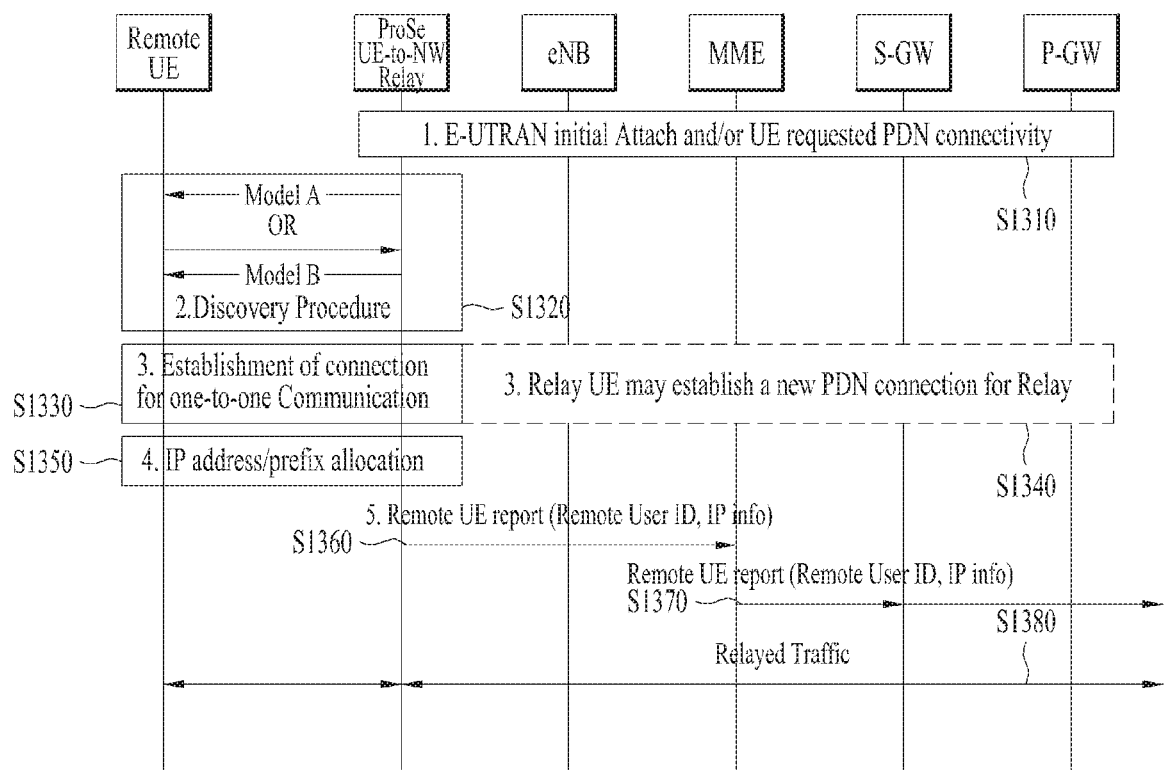
FIG. 13 is a diagram illustrating a procedure in which a remote UE performs direct communication through a UE-to-network relay.

FIG. 13 illustrates a procedure in which a remote UE that is not served by an E-UTRAN performs direct communication through a UE-to-network relay. A UE capable of operating as a ProSe UE-to-network relay may establish a PDN connection to provide relay traffic to the remote UE by accessing the network. The PDN connection supporting the UE-to-network relay is used only to provide the relay traffic to the remote UE.

First, a relay UE establishes a PDN connection through initial access to an E-UTRAN [S1310]. In the case of IPv6, the relay UE obtains an IPv6 prefix using a prefix delegation function. Next, the relay UE performs a discovery procedure, which differs depending on either Model A or Model B, together with a relay UE [S1320]. The remote UE selects the relay UE discovered through the discovery procedure and then establishes one-to-one direct connection [S1330]. If there is no PDN connection associated with a relay UE ID or if an additional PDN connection for relay operation is required, the relay UE initiates a new PDN connection procedure [S1340].

Next, an IPv6 prefix or an IPv4 address is allocated to the remote UE [S1350], and then uplink/downlink relay operation is initiated. When the IPv6 prefix is allocated, an IPv6 stateless address auto-configuration procedure configured with router solicitation signaling from the remote UE to the relay UE and router advertisement signaling from the relay UE to the remote UE is initiated. On the other hand, when the IPv4 address is allocated, an IPv4 address allocation using DHCPv4 procedure configured with DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE) is initiated.

Thereafter, the relay UE performs a Remote UE Report procedure for informing an MME that the relay UE is connected to the remote UE [S1360]. The MME performs a Remote UE Report Notification procedure to inform an SGW and a PGW that the new remote UE is connected [S1370]. Then, the remote UE performs communication with the network through the relay UE [S1380]. Details of the direct connection generation procedure could be found in TS 23.303.

3. Proposed D2D Direct Communication Method

The value of reference signal received power (RSRP), which is measured by a remote UE for a Uu interface with an eNB, may become a condition for direct communication between remote and relay UEs, which uses PC5 radio resources. Specifically, when the measured RSRP value is lower than a predetermined threshold, the remote UE can directly communicate with the relay UE. On the other hand, when the measured RSRP value is equal to or higher than the predetermined value, the remote UE should terminate the direct communication with the relay UE. This is because since a sufficiently high RSRP value means that a serving cell can allocate radio resources to the remote UE in coverage of the eNB, the remote UE does not need to rely on the remote UE for the radio resource allocation.

Figure 14:
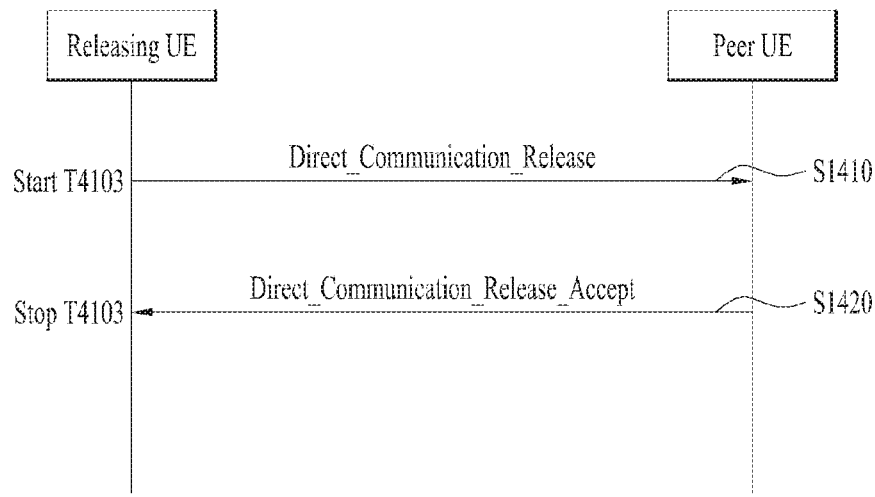
FIG. 14 illustrates a procedure for releasing a D2D direct link

Hereinafter, a description will be given of the conventional direct link release procedure related to the proposed embodiment with reference to FIG. 14. As described above, when the measured RSRP value is equal to or higher than the threshold, the remote UE terminates the direct communication with the relay UE, and thus the direct link release procedure is performed between the remote UE (or releasing UE) and the relay UE (or peer UE). This procedure can be performed such that the remote UE transmits a Direct Communication Release message to the relay UE [S1410] and the relay UE transmits a Direct Communication Release Accept message to the remote UE in response to the Direct Communication Release message [S1420]. In this case, a predetermined timer (e.g., T4103) may start with the transmission of the Direct Communication Release message.

Meanwhile, as described above, when the measured RSRP value of the serving cell is equal to or higher than the threshold, the remote UE stops using the radio resources allocated for the direct communication with the relay UE. However, a problem may occur during this process. That is, although the remote UE stops use of the radio resource through a PC5 interface, the direct link between the remote and relay UEs is considered to be valid unless the direct link release procedure is performed. Thus, the remote UE may keep trying to transmit a PC5 message or traffic to the relay UE. However, since the remote UE cannot use the radio resource allocated for the direct communication, the remote UE is unable to receive or transmit any PC5 message or data.

This problem is caused because even though a lower layer such as an AS layer has stopped to use the radio resources for the direct communication, the relevant information is not delivered to an upper layer such as a ProSe layer. That is, the upper layer creates messages to transmit PC5 messages or data packets through the PC5 interface, continuously delivers the messages to the lower layer, and expects responses from the relay UE without knowing the fact that the radio resources are unavailable. However, since the lower layer has stopped to use the radio resources for the direct communication, the lower layer does not transmit the PC5 messages or data packets to the relay UE. For example, the lower layer discards the data packets received from the upper layer.

In particular, when radio resources for D2D direct communication are directly allocated by a network, a lower layer may not recognize the situation that an upper layer is unable to use the radio resources for the direct communication. In this case, if there is data or a PC5 signaling message (e.g., Keep Alive message, etc.) to be transmitted by a ProSe layer of a remote UE in idle mode, as the preceding step, an operation for connecting to the network may be performed before requesting the network to allocate the resources for the direct communication. In this case, a NAS layer keeps transmitting a service request (SR), and thus an RRC layer should perform a procedure for establishing an RRC connection and a procedure for transmitting the SR. To this end, if the remote UE transitions to connected mode or is in the connected mode, the remote UE may attempt to transmit SidelinkUEInformation and SL_BSR (SideLink_Buffer Status Report) to the network to request the network to allocate the resources for the direct communication. Since such an attempt may cause unnecessary resource consumption, the upper layer (in particular, NAS and Prose layers) of the remote UE should accurately recognize the state of the lower layer (in particular, AS layer).

Hereinafter, embodiments for solving the problems that occur when the remote UE stops using the radio resources for the direct communication with the relay UE because the RSRP value, which is measured by the remote UE, is equal to or higher than the threshold will be described with reference to FIGS. 15 to 17. For convenience of description, lower and upper layers are respectively assumed to be AS and ProSe layers in the following description.

Figure 15:
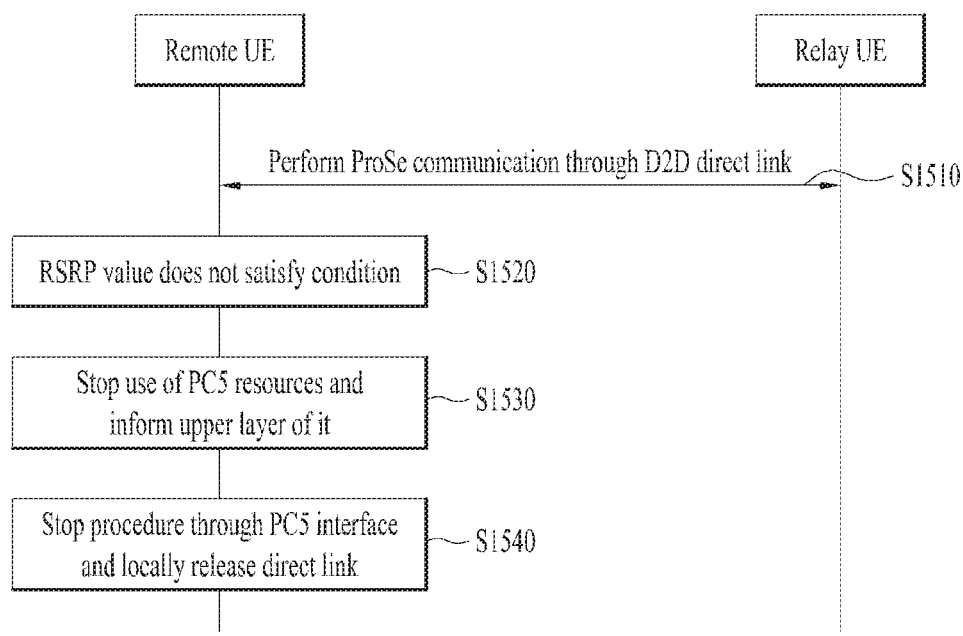
FIGS. 15 to 17 illustrate direct communication methods according to proposed embodiments.

According to the embodiment shown in FIG. 15, the remote UE having a direct link with the relay UE measures the RSRP value of the current serving cell. If the measured RSRP value is equal to or higher than a threshold, that is, if the condition for using radio resources for direct communication is not satisfied, the remote UE should stop using the radio resources [S1510 and S1520]. In this case, since the remote UE decides not to use the radio resources for the direct communication by itself, an upper layer of the remote UE should recognize that PC5 messages or data cannot be transmitted through the direct link anymore. To this end, when the measured RSRP value is equal to or higher than the threshold, a lower layer of the remote UE should inform the upper layer of the fact that the measured RSRP value is equal to or higher than the threshold. Of course, when the measured RSRP value is lower than the threshold, the lower layer should inform the upper layer of it.

Meanwhile, when it is recognized that the RSRP value does not satisfy the condition for using the radio resources, the upper layer of the remote UE locally releases the direct link with the relay UE because it cannot transmit PC5 messages or data through the direct link anymore [S1540]. After releasing the direct link with the relay UE, the remote UE does not transmit any message to the relay UE and does not expect any message from the relay UE. In addition, the remote UE may delete not only context information existing on the direct link with the relay UE but also the IP address allocated through the relay UE. Then, if there still remains an EPS bearer context (or packet data protocol (PDP) context) stored in an EPC before the remote and relay UE are connected, the EPS bearer context is activated again and the previously stored IP address is also activated again.

Figure 16:
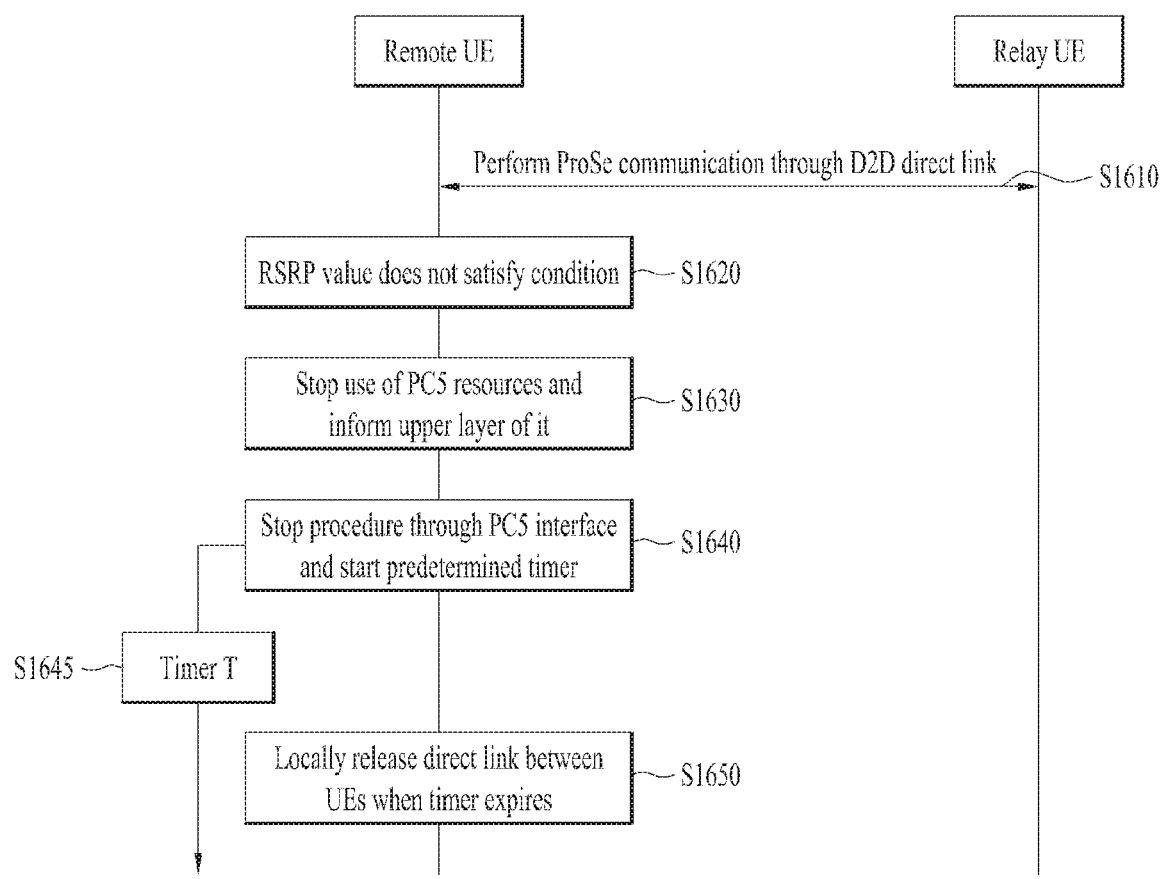
Figure 17:
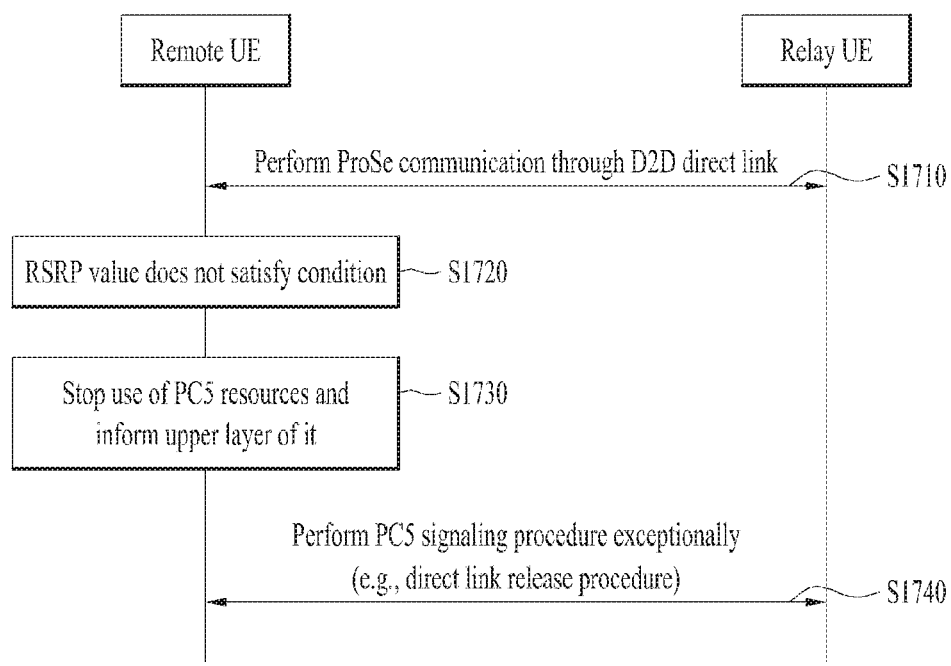

FIG. 16 is a diagram illustrating another proposed embodiment. To perform ProSe communication through a direct link to a relay UE, a remote UE may receive parameters for direct communication while establishing the direct communication link. In this process, the above-described RSRP (RSRQ) threshold may be transmitted to the remote UE. Meanwhile, the remote UE performing the direct communication with the relay UE may measure RSRP of a serving cell. In this case, if the RSRP value is equal to or higher than the received threshold, that is, if the condition for using radio resources is not satisfied [S1610 and S1620], a lower layer of the remote UE transmits, to an upper layer thereof, information (or an indicator) indicating that use of the radio resources will be stopped [S1630]. Thereafter, the remote UE aborts all procedures associated with the PC5 interface (e.g., PC5 signaling protocol procedure, PC5 discovery protocol procedure, and data transmission and reception procedure) and then starts a prescribed timer [S1640 and S1645]. In the case, the value of the timer, T may be set to a random value in a UE-specific manner.

While the timer is operating, the remote UE does not initiate any procedures over the PC5 interface. Meanwhile, if the remote UE receives from the lower layer information (or an indicator) indicating that use of the radio resources for the direct communication will be started, the remote UE stops the timer and if necessary, initiates a procedure over the PC5 interface. On the other hand, when the timer expires, the remote UE locally release the direct link [S1650], deletes all direct link contexts, and then replace the deleted direct link contexts with the EPS bearer context.

Unlike the embodiment illustrated in FIG. 15, in the embodiment of FIG. 16, even if the information indicating that the RSRP (or RSRQ) value is equal to or higher than the threshold is received from the lower layer, the remote UE does not immediately stop the procedures associated with the PC5 interface or does not locally release the direct link. Instead, the remote UE starts the prescribed timer and then waits for the RSRP (or RSRQ) value to become lower than the threshold again during the corresponding time period (that is, the remote UE expects that the condition for using the radio resources will be satisfied). After elapse of the time period, the remote UE locally releases the direct link to the remote UE. The local release of the direct link with the relay UE means that the remote UE autonomously releases the direct communication instead of performing a process for transmitting the Direct Communication Release message to the relay UE.

Meanwhile, even if a lower layer informs an upper layer that radio resources for direct communication cannot be used, it is difficult to completely solve problems in a direct link between relay and remote UEs. This is because since the upper layer cannot perform PC5 signaling although the upper layer desires to release the direct link to the relay UE after recognizing that the radio resources for the direct communication cannot be used, the upper layer may not correctly perform the direct link release procedure. In other words, the remote UE can locally release the direct link autonomously as described in FIGS. 15 and 16, but if the relay UE recognizes that the direct link to the remote UE, it is beneficial in terms of reducing signaling overhead and radio resource consumption.

Accordingly, another embodiment for solving the above-described problem will be explained with reference to FIG. 17. According to the embodiment described in FIG. 17, when an AS condition is not satisfied at the lower layer and relevant information is transmitted to the upper layer, the upper layer exceptionally allows transmission of a PC5 signaling message instead of stopping communication using PC5 radio resources. This is because if the direct link release procedure is normally performed by transmitting the Direct Communication Release message to the relay UE, the relay UE can recognize that the direct link to the remote UE is released, thereby reducing unnecessary signaling and radio resource consumption.

First, the lower layer may stop using radio resources for direct communication in the following cases: i) when the AS condition is not satisfied as described above (e.g., when the RSRP/RSRQ value is equal to or higher than the threshold); and ii) when the network instructs to stop the use of the radio resources for the direct communication. In the latter case, since the remote UE receives explicit instruction from the network, the network immediately stops allocation for performing transmission through the PC5 interface as soon as sending the instruction. In this case, since the remote UE has no way of sending a PC5 message, it does not cause any problem if the local release is performed. However, in the former case, since the remote UE autonomously stops the use of radio resources for performing transmission through the PC5 interface by measuring the RSRP value by itself, the PC5 signaling procedure may be exceptionally allowed instead of stopping all the procedure associated with the PC5 interface. Further, only the direct link release procedure in the PC5 signaling procedure may be allowed.

To this end, in an embodiment of the present invention, the lower layer of the remote UE may distinguish between the aforementioned two cases and then inform the upper layer of the cases. For example, when the lower layer informs the upper layers that the network instructed to stop the use of the radio resources, the remote UE stops all the operations over the PC5 interface (e.g., data transmission, data reception, PC5 signaling message transmission, etc.). Thereafter, the remote UE may locally release the direct link, delete the direct link contexts, replace them with the EPS bearer context, and then activate the EPS bearer context.

On the contrary, when the RSRP/RSRQ value measured by the remote UE performing the direct communication with the relay UE does not satisfy a predetermined condition (e.g., when the measured RSRP/RSRQ value is equal to or greater than the threshold), the lower layer of the remote UE informs the upper layer of information indicating that the AS condition is not satisfied and thus, stops using the PC5 radio resources [S1710, S1720, and S1730]. In this case, the remote UE stops data transmission and reception over the PC5 interface, but exceptionally allows the PC5 signaling procedure [S1740]. Thus, the remote UE can transmit and receive PC5 signaling message to and from the relay UE. In this case, only the direct link release procedure in the PC5 signaling procedure may be allowed exceptionally. To this end, when the upper layer of the remote UE receives, from the lower layer, the information indicating that the measured RSRP/RSRQ value does not satisfy the predetermined condition (that is, the measured value is equal to or higher than the threshold), the upper layer (e.g., ProSe layer) generates a PC5 signaling message (e.g., Direct Communication Release message) for performing the direct link release procedure in the PC5 signaling message and then transmits the generated PC5 signaling message to the lower layer. In this case, an indicator indicating that the corresponding message is the Direct Communication Release message may be sent together with the PC5 signaling message. Upon receiving the message, the lower layer checks the indicator and then forwards the PC5 signaling message received from the upper layer for the direct communication. Meanwhile, when a PC5 message or data is received without the indicator, the lower layer does not forwards the message or data but discards it.

The upper layer of the remote UE transmits the Direct Communication Release message to the relay UE having the established direct link by performing the direct link release procedure. In this case, as information indicating the release cause, '#1: communication to peer UE no longer needed' or a new cause may be included in the message. After completing transmission of the release message, the remote UE may locally release the direct link, delete the direct communication contexts, and if the EPS bearer context exists, replace them with the EPS bearer context.

Meanwhile, unlike the above-described embodiment, only in the case where the AS condition is not satisfied among the above-described two cases where the use of the radio resources for the direct communication is stopped, the lower layer of the remote UE may be configured to inform the upper layer that the use of the radio resources is stopped. As another example, when the upper layer fails to understand the reason for stopping even though the lower layer informs that the use of radio resources is stopped, the upper layer of the remote UE may stop all the operations over the PC5 interface and locally release the direct communication link.

As a further example, a method for allowing the PC5 signaling procedure during a predetermined timer period instead of allowing the PC5 signaling procedure exceptionally may be considered. That is, when the lower layer of the remote UE informs the upper layer that the use of the radio resources for the direct communication is stopped due to the unsatisfied AS condition, the lower layer may start a timer (e.g., T3xx) for a predetermined time period instead of immediately stopping the use of the radio resources. Until expiration of this timer, it is allowed to perform transmission and reception using the radio resources for the direct communication. Meanwhile, if the lower layer is able to distinguish between data and a PC5 signaling message, only the PC5 signaling message may be allowed. When the upper layer transmits a PC5 signaling message to the lower layer to enable the lower layer to distinguish the PC5 signaling message from data, an indicator indicating that a corresponding PC5 message is the PC5 signaling message may be transmitted together. Upon receiving the message, the lower layer may forward the received PC5 signaling message through the direct link by checking the indicator. Similarly, when a PC5 message or data is transmitted without the indicator, the PC5 message and data may be discarded. In either case, when the corresponding timer expires, it is not allowed to use the radio resources for transmitting all traffic through the PC5 message, which is transmitted from the upper layer, is not allowed.

In this case, the aforementioned timer may be transmitted by the lower layer to the upper layer. By using the received timer, the upper layer may expect when the use of the radio resources will be stopped. In addition, based on the expectation, the upper layer may terminates data transmission for the direct communication or release the direct communication link.

When transmission of the PC5 signaling message is exceptionally allowed for the release procedure as described above, the remote UE transmits the Direct Communication Release message to the relay UE to directly perform the direct link release procedure. In this case, the Direct Communication Release message may include, as the release cause, information indicating '#1: communication to peer UE no longer needed' or information indicating a new cause. The remote UE transmits the Direct Communication Release message including the release cause to the relay UE. According to an embodiment of the present invention, in this environment, the Direct Communication Release message may be transmitted once. In other words, after transmitting the Direct Communication Release message, the remote UE starts the timer described in FIG. 14. In addition, the remote UE may locally release the direct link to the relay UE immediately after transmitting the release message without waiting for an accept message. When the Direct Communication Release message is transmitted, timer T4103 may not be started. Even if the timer starts, it may stop immediately. No waiting for the accept message means that even though there is no received accept message, retransmission of the Direct Communication Release message is not performed. After locally releasing the direct link, the remote UE deletes all direct link contexts and if the EPS bearer context exists, replace them with the EPS bearer context.

According to the above-described embodiments, it is possible to solve the problems that occur when the remote UE stops using the radio resources for the direct communication with the relay UE because the measured RSRP of the serving cell is equal to or higher than the threshold. In particular, according to the proposed embodiments, the invention is advantageous in that operations related to the PC5 interface can be efficiently controlled based on conditions of the Uu interface detected by the lower layer. Meanwhile, although the present invention is described focusing on operations of the remote UE, the aforementioned embodiments can be applied to not only the remote UE but also the relay UE in the same or similar manner.

4. Device Configurations

Figure 18:
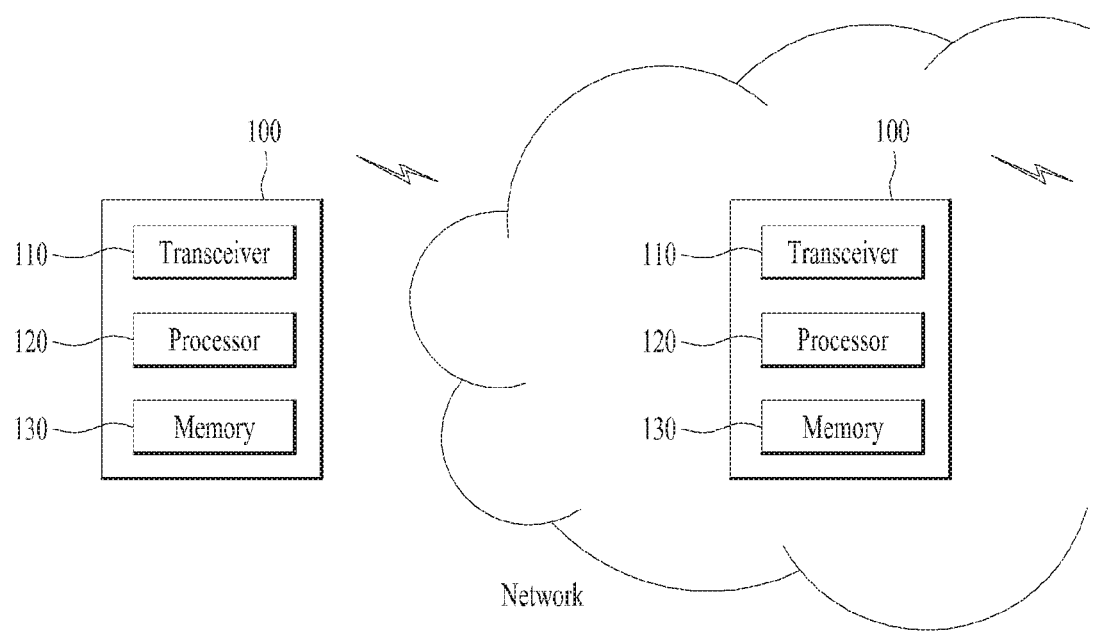
FIG. 18 is a diagram illustrating the configuration of a node device according to a proposed embodiment.

FIG. 18 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 18, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned D2D direct communication method can be applied to not only the 3GPP system but also various wireless communication systems including the IEEE 802.16x system and IEEE 802.11x system. Further, the proposed method can also be applied to the mmWave communication system using ultra-high frequency bands.

What is claimed is:

1. A method for performing direct communication with a relay user equipment (UE) through an established direct link by a remote UE, which relates to a proximity service-enabled (ProSe-enabled) UE, in a wireless communication system, the method comprising:
    receiving, at a ProSe or Non-Access Stratum (NAS) layer of the remote UE from a lower layer, information informing that since a predetermined Access Stratum (AS) condition is not satisfied, use of radio resources for the direct communication with the relay UE is stopped;
    stopping procedures associated with a PC5 interface and starting a timer;
    based on receiving, from the lower layer, information related to the use of the radio resources before expiration of the timer, stopping the timer and performing a procedure over the PC5; and
    based on the expiration of the timer, locally releasing the direct link to the relay UE.

2. The method of claim 1, further comprising:
    measuring, at the lower layer, reference signal received power (RSRP) or reference signal received quality (RSRQ) of a serving cell of the remote UE; and
    based on the measured RSRP or RSRQ being equal to or higher than a predetermined threshold, determining that the AS condition is not satisfied,
    wherein the lower layer is a radio resource control (RRC) layer of the remote UE.

3. The method of claim 1, wherein the procedures associated with the PC5 interface includes at least PC5 signaling protocol procedure, PC5 discovery protocol procedure, data transmission procedure or data reception procedure.

4. The method of claim 1, wherein based on the timer running, the remote UE does not initiate any procedure over the PC5 interface.

5. The method of claim 1, wherein the direct link is locally released by deleting context information of the direct link and replacing the deleted context information with an evolved packet system (EPS) bearer context.

6. The method of claim 1, wherein even based on the communication over the PC5 interface stopping, transmission of a Direct Communication Release message is exceptionally allowed, and wherein the Direct Communication Release message includes, as a release cause, information informing that the communication with the relay UE is no longer needed.

7. The method of claim 6, wherein based on transmission of the ProSe layer, to the lower layer, a PC5 signaling message for releasing the direct link, information informing that the PC5 signaling message is the Direct Communication Release message is transmitted together with the PC5 signaling message.

8. A remote user equipment (UE), which relates to a proximity service-enabled (ProSe-enabled) UE, for performing direct communication with a relay UE through an established direct link in a wireless communication system, the remote UE comprising:
    a transceiver; and
    a processor that;
    receives, at a ProSe or Non-Access Stratum (NAS) layer of the remote UE from a lower layer, information informing that since a predetermined Access Stratum (AS) condition is not satisfied, use of radio resources for the direct communication with the relay UE is stopped;
    stops procedures associated with a PC5 interface and starts a timer;
    based on receiving, from the lower layer, information related to the use of the radio resources before expiration of the timer, stops the timer and performs a procedure over the PC5; and
    based on the expiration of the timer, locally releases the direct link to the relay UE.

9. The remote UE of claim 8, wherein the processor further:
    measures, at the lower layer, reference signal received power (RSRP) or reference signal received quality (RSRQ) of a serving cell of the remote UE; and
    based on the measured RSRP or RSRQ being equal to or higher than a predetermined threshold, determine that the AS condition is not satisfied,
    wherein the lower layer is a radio resource control (RRC) layer of the remote UE.

10. The remote UE of claim 8, wherein the procedures associated with the PC5 interface includes at least PC5 signaling protocol procedure, PC5 discovery protocol procedure, data transmission procedure or data reception procedure.

11. The remote UE of claim 8, wherein based on the timer running, the remote UE does not initiate any procedure over the PC5 interface.

12. The remote UE of claim 8, wherein the direct link is locally released by deleting context information of the direct link and replacing the deleted context information with an evolved packet system (EPS) bearer context.

13. The remote UE of claim 8, wherein even based on the communication over the PC5 interface stopping, transmission of a Direct Communication Release message is exceptionally allowed, and wherein the Direct Communication Release message includes, as a release cause, information informing that the communication with the relay UE is no longer needed.

14. The remote UE of claim 8, wherein based on transmission of the ProSe layer, to the lower layer, a PC5 signaling message for releasing the direct link, information informing that the PC5 signaling message is the Direct Communication Release message is transmitted together with the PC5 signaling message.

\* \* \* \* \*